Patented Dec. 16, 1930

1,785,260

UNITED STATES PATENT OFFICE

SHINJIRO HORII, OF TOKYO, JAPAN

STENCIL SHEET

No Drawing. Application filed November 17, 1928, Serial No. 320,215, and in Japan June 15, 1928.

My invention relates to improvements in stencil sheets of the kind used for duplicating manuscript and typewritten documents, drawings and the like, consisting of a sheet of fibrous material coated or impregnated with a coating material which is impermeable to ink and can be stencilized by the pressure of a stylus or by the impact of the types of a writing machine.

It has previously been proposed to coat a sheet of Japanese Yoshino paper with cellulose esters, such as cellulose acetate or nitrate, softened by oils and greases. A clear film of cellulose esters especially of those having low viscosity, however, is highly unstable and is extremely sensitive to the ultra-violet rays, and a clear film exposed for only a few days becomes so brittle that it will not withstand slight bending without cracking. The use of oils and plasticizers will extend this life, but eventually failure will occur. The oils become rancid on exposure and make the film sticky. Consequently, such a stencil sheet is unstable for use in many climates.

It has been found that durability under conditions of exposure to atmosphere depends largely on the nature of coloring substances contained in the ingredients of the film, and the film is protected against deterioration due to the action of the sunlight. The effect of coloring substances on the durability of the film is especially marked. Coloring substances, dyes or pigments, which pass the ultra-violet rays will result in the deterioration of the film in a short time. Typical examples are the colors of blue, violet, purple, indigo, green, such, for example, as victoria blue, methyl violet and certain types of ultramarine pigments when used in the coating. On the other hand, when the stabilizing dyes or pigments, which absorb the ultra-violet rays of the spectrum, are applied to the film together with a tempering agent a strong resistance to sunlight will result. The stabilizing coloring substances possible to protect the film from deterioration are the dyes or pigments of yellow, orange, red and brown which reflect or absorb the ultra-violet rays of the sunlight.

The object of the present invention is to provide improvements in connection with stencil sheets of the kind specified.

According to the present invention the coating composition comprises esters of polysaccharides, tempering agents and stabilizing coloring substances.

In this connection there has been proposed the incorporation of dyes or pigments, such as bentonite, powdered soap-stone, china-clay, titanium oxide, zinc oxide, Prussian blue and other coloring substances, in the coating material in association with a tempering agent and cellulose esters. It also has been proposed to provide a backing for stencil sheets of hard-faced paper having on one side a coating composed of linseed oil varnish, in which is ground any of the well-known unctuous earthy substances, such as kaolin, umber, barium sulfate, or the like.

In the manufacture of certain articles actinic-ray-absorbing or arresting ingredients have been incorporated to act as a strengthening means, as for example pyroxylin plastic sheeting, and although some coloring substances have been used in combination with the cellulosic film for the purpose of retarding the action of the actinic light, it has not, heretofore, been proposed to apply this to the art of manufacturing stencil sheets. And altho some coloring substances have been used in the coating material of stencil sheets, it was never intended to use such stabilizing colors for the specific object as in the present invention. Moreover, it is far more necessary to protect the coating of stencil sheets against the action of the actinic light than other films of cellulosic coating.

In carrying out the invention a sheet of porous base, such as Yoshino paper, is coated or impregnated with a coating composition prepared by dissolving esters of polysaccharides, such as starch acetate, mannan acetate, cellulose acetate, and cellulose nitrate, in any suitable solvents, such as acetone, alcohol, butyl alcohol, benzyl alcohol, amyl acetate, benzine, benzol, toluol, or a mixture of them, and mixing therewith a suitable tempering agent, such as natural or artificial resins, oils, blown oils, polymerized oils, fats, waxes, fatty acids, naphthenic acids, glycerin esters or glycol esters of fatty acids, naphthenic acid glycerides, solid hydrocarbons, chlorinated naphthalene, ethyl or butyl phthalate, butyl stearate, butyl tartrate and triphenyl or tricresyl phosphate, or a mixture of them and a stabilizing coloring substance, such as chrome yellow, chrome orange, oxide red (Turkey, Indian, Venetian red) umber, ochre, toluidine red, Bismarck brown lake, alizarin red, lithol red, paranitraniline red alone or in mixture. It is more effective to use opaque pigments, in connection with the above mentioned coloring substances.

The proportions of the ingredients of the composition may vary according to several circumstances. The following is an example:

|  | Parts by weight |
|---|---|
| Cellulose nitrate | 10 |
| Ethyl acetate | 20 |
| Alcohol | 20 |
| Amyl acetate | 30 |
| Butyl alcohol | 10 |
| Benzol | 30 |
| Naphthenic acid glyceride | 10 |
| Tsubaki oil | 10 |
| Oleine | 5 |
| Toluidine red | 2 |
| Bismarck brown lake | 2 |

The term "esters of polysaccharides" is intended to include not only one of definite esters of polysaccharides, but also a mixture of them.

What I claim is:—

A stencil sheet adapted for stencilizing by pressure, comprising a base of fibrous material coated with a coating composition consisting of a solution of esters of polysaccharides, tempering agents and stabilizing coloring substances which absorb the ultra-violet rays of the sunlight.

In testimony whereof I affix my signature.

SHINJIRO HORII.